June 7, 1955  J. R. SOLTAN  2,709,986
BIRD FEEDER
Filed July 20, 1953

Joseph R. Soltan
INVENTOR

BY *Ca Snow & Co.*
ATTORNEYS.

2,709,986

BIRD FEEDER

Joseph R. Soltan, Chicago, Ill.

Application July 20, 1953, Serial No. 369,137

1 Claim. (Cl. 119—51)

This invention relates to a bird feeding device and more particularly to a parakeet feeding bar and supporting means for the bar.

It is an object of this invention to provide a novelty for currently popular parakeet birds and a supporting, fenced, space for the novelty, the fenced space withholding in a confined base area portions of the bird food, and shells of the bird food, discarded by the bird feeding on the novelty, thereby limiting the cleaning necessary about the novelty and base.

It is another object of this invention to provide a novelty bird feeding device of this kind having readily removable bird feeding receptacles of the kind to be more particularly described hereinafter which may be assembled and constructed at a low cost to the desires of the owner for the attraction of a bird as a parakeet.

A further object of this invention is to provide a "snack bar" for a parakeet bird to attract or entice the bird for eating or drinking by providing "ladders," which are attractive to certain kinds of birds as parakeets. Other attraction devices are supported on the "snack bar," as a mirror or reflecting surface, for enticing certain kinds of birds for feeding on the "snack bar."

Other and further objects and advantages of the invention will be hereinafter described and novel features thereof defined in the appended claim.

Figures 1, 2:
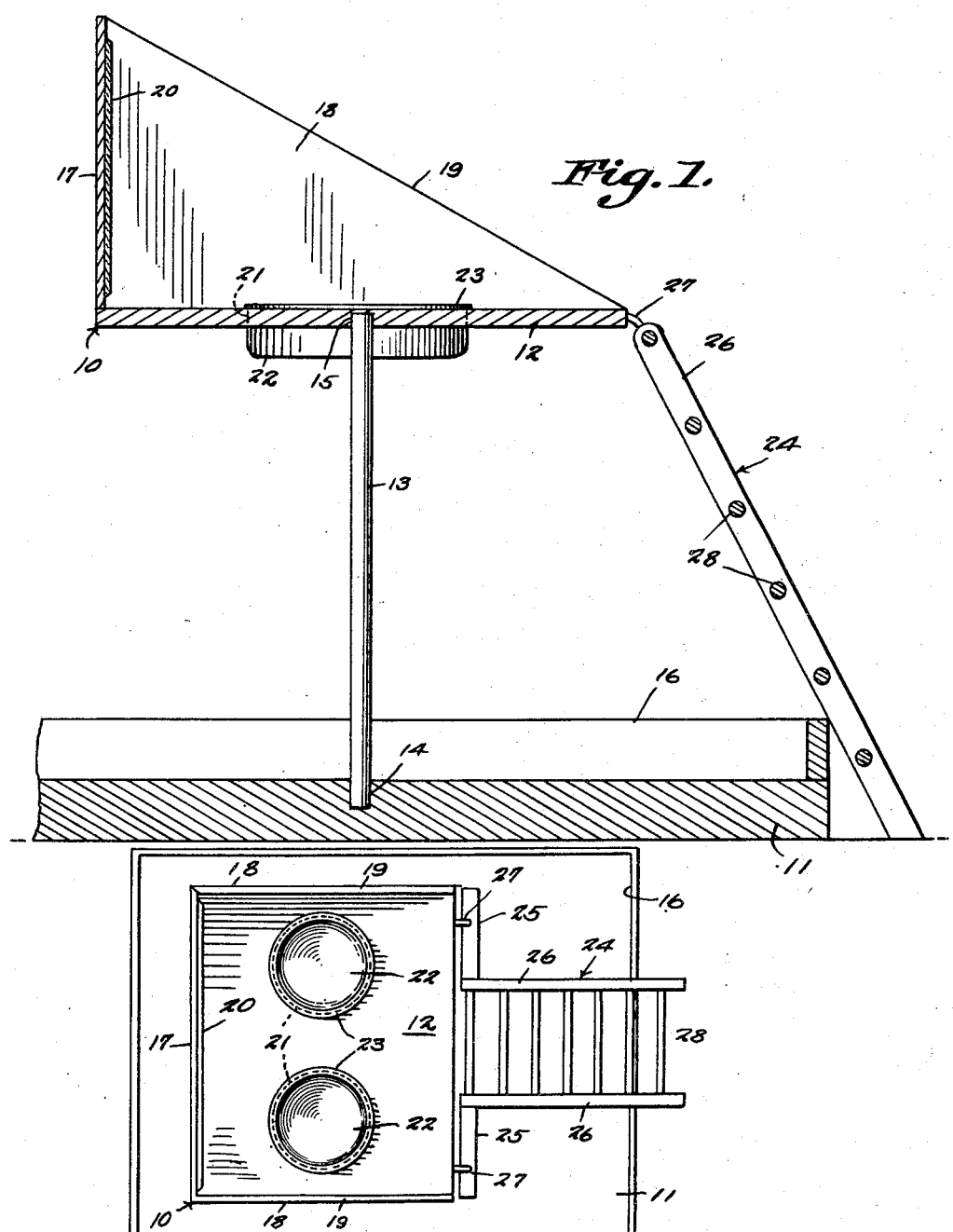
Figure 1 is a side elevation, partly broken away and partly in section, of a parakeet bird attracting and feeding device constructed according to an embodiment of this invention.
Fig. 2 is a top plan view on a smaller scale of the parakeet attracting and feeding device shown in Fig. 1.

Referring to the drawings, the numeral 10 designates generally a parakeet attracting and feeding device constructed according to an embodiment of this invention. The attracting and feeding device 10 is provided with a flat base 11 and a platform 12 supported above the base 11 by a pedestal 13. Bird or parakeet food and attracting means are adapted to be supported on the platform 12 to which the parakeet may be attracted and from which the parakeet may feed. While this attracting device 10 has been made particularly for parakeet birds, it is to be understood that the bird attracting and feeding device 10 may be suitably applied to any other type of bird which may be attracted to the device and feed therefrom.

The base 11 may be of any suitable exterior configuration and the pedestal 13 is adapted to be secured on the base 11 by having one end of the pedestal 13 fixedly engaged in a bore 14 substantially at the center of the base 11, and the upper end of the pedestal secured in a correlated bore 15 on the lower surface of the platform as clearly indicated in Fig. 1 of the drawings. The pedestal 13 is in the form of a dowel, a wooden strip of wood circular in cross section, or may be made of metal, circular in cross section, as a rod, depending on the choice of the person manufacturing the attracting and feeding device 10.

The base 11 is provided with a fence 16 extending upwardly therefrom and engaged about the periphery of the base for purposes to be more clearly described hereinafter.

The platform 12 is provided with an upstanding rear wall 17 rigidly secured at the lower end thereof adjacent to one side edge of the rectangular platform 12. The rear wall 17 may be secured by gluing, by nails or pins, not shown in the drawings, or any other suitable method for securing the lower end of the wall 17 to one edge of the platform 12. A pair of longitudinally spaced apart side walls 18 are rigidly secured to the platform 12 along two other side edges of the platform 12 and extend vertically upward therefrom. One end edge of each of the vertically extending side walls 18 is fixedly secured to the adjacent side edge of the vertically extending rear wall 17. The top edge 19 of each of the side walls 18 is inclined downwardly and forwardly from the rear wall 17 from the juncture of the correlated joining edges of the walls 17 and 18 forwardly and downwardly to the front end of the platform 12, as clearly indicated in Fig. 1 of the drawings.

A mirror 20 is fixedly secured to the rear wall 17 between the side walls 18 and 19 and faces forwardly from the rear wall to the space between the side walls so that a parakeet or other bird on the upper surface of the platform 12 may view a reflection in the mirror while standing on the platform 12 between the side walls 18. The mirror 20 will provide this attraction for certain types of bird and it is to be understood that in place of the mirror 20 any other suitable reflecting surface, as a shining metal, may be secured on the rear wall 17 between the side walls 18.

The pedestal 12 is provided with a pair of spaced apart bored openings therethrough, as indicated by the numeral 21 and a receptacle 22 may be seated in each of the openings 21 for containing bird food particularly attractive to the bird on the platform 12 of the feeding device 10. The receptacles 22 are in the form of dishes or cups which may be slidably engaged through each of the openings 21 and provided with an outwardly extending flange or upper lip 23 for properly locating the receptacle 22 in its desired opening.

A ladder 24 may be positioned at one edge of the platform 12 between the side walls 18 and at the edge of the platform opposite from the vertically extending wall 17 and mirror 20. The ladder 24 is provided with a longitudinally extending supporting bar 25 secured to the upper ends of the vertically extending side arms 26 of the ladder 24 and each of the supporting bars 25 is provided with an outwardly and upwardly extending supporting member 27 which is adapted to be engaged with the outer edge of the platform 12 on the opposite side of the ladder 24. The ladder 24, including the side arms 26 and supporting rungs 28, appears to be a special treat for certain birds, especially parakeets, who have a natural instinct to climb.

The ladder 24 will engage the platform 12 at the upper end of the ladder and the lower end of the ladder may engage the base 11 or some other adjacent supporting surface for both the base 11 and the attracting and feeding device 10.

In the use and operation of the novelty bird attracting and feeding device 10, described above, the entire device 10 including the base 11 and platform 12 may be supported on a substantial supporting device either within the home or exteriorly thereof. The receptacles 22 are filled with suitable bird food including an attractive food or some selected medicinal food for the bird. The ladder 24 and reflector 20 may provide a sort of attraction for enticing a bird onto the platform 12 and partaking of the food within the receptacle 22.

When the food eaten by the bird includes a shell, as do most of the bird foods, the bird may eat the food from the shell and then discard the shell and the shell may fall from the platform 12 onto the base 11 and the discarded shells are confined to the upper surface of the base by the fence 16 so that the cleaning of the area below the receptacle 22 may be easily and readily accomplished by simply cleaning the upper surface of the base 11 within the fence 16. The shells of the food for the bird and other discarded food particles may be easily gathered from within the fence 16 so that the area below the food receptacles and the birds may be readily confined to the area enclosed by the fence and thus preserving a clean area within which a bird, as a parakeet, is free to move about.

While the specific details of one embodiment of this invention have been herewith shown and described, the invention is not confined thereto as changes and alterations may be made without departing from the spirit and scope thereof as defined in the appended claim.

I claim:

A novelty bird feeding device of the kind described comprising a rectangular base, a fence on said base around the periphery thereof, a horizontal flat platform supported from said base in vertical spaced relation thereto, an upstanding rear wall on said platform, perpendicular side walls on said platform engaging at one end thereof said rear wall at an opposite end thereof, upwardly open receptacles on said platform for containing bird food, an upstanding inclined ladder remote from said rear wall engaging at one end thereof on an edge of said platform depending therefrom, a reflecting member on said rear wall facing the other end of said side walls and an upright pedestal engaged between said base and said platform.

References Cited in the file of this patent

UNITED STATES PATENTS

| | | |
|---|---|---|
| 1,452,366 | Egan | Apr. 17, 1923 |
| 1,976,234 | Larson | Oct. 9, 1934 |
| 2,555,396 | Cosner | June 5, 1951 |
| 2,579,797 | Churchfield et al. | Dec. 25, 1951 |
| 2,659,345 | Herbert | Nov. 17, 1953 |

FOREIGN PATENTS

| | | |
|---|---|---|
| 305,746 | Great Britain | Feb. 14, 1929 |